United States Patent
Seo et al.

(10) Patent No.: US 10,701,581 B2
(45) Date of Patent: Jun. 30, 2020

(54) METHOD FOR MEASURING AND REPORTING D2D RESOURCE IN WIRELESS COMMUNICATION SYSTEM, AND APPARATUS THEREFOR

(71) Applicant: LG ELECTRONICS INC., Seoul (KR)

(72) Inventors: Inkwon Seo, Seoul (KR); Hanbyul Seo, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 29 days.

(21) Appl. No.: 16/069,454

(22) PCT Filed: Dec. 26, 2016

(86) PCT No.: PCT/KR2016/015283
§ 371 (c)(1),
(2) Date: Jul. 11, 2018

(87) PCT Pub. No.: WO2017/122949
PCT Pub. Date: Jul. 20, 2017

(65) Prior Publication Data
US 2019/0021019 A1    Jan. 17, 2019

Related U.S. Application Data

(60) Provisional application No. 62/278,970, filed on Jan. 14, 2016, provisional application No. 62/328,571, filed on Apr. 27, 2016.

(51) Int. Cl.
*H04W 24/10* (2009.01)
*H04W 24/02* (2009.01)
(Continued)

(52) U.S. Cl.
CPC ......... *H04W 24/10* (2013.01); *H04B 17/318* (2015.01); *H04L 43/16* (2013.01);
(Continued)

(58) Field of Classification Search
CPC ..... H04W 24/10; H04W 24/02; H04W 28/08; H04W 72/085; H04W 72/1263; H04B 17/318; H04L 43/16
See application file for complete search history.

(56) References Cited

U.S. PATENT DOCUMENTS

2010/0128614 A1   5/2010  Kuusela et al.
2015/0003322 A1*  1/2015  Pyattaev ........... H04W 28/0221
                                                        370/328
(Continued)

FOREIGN PATENT DOCUMENTS

WO    2014089094 A1   6/2014
WO    2015016567 A1   2/2015
(Continued)

OTHER PUBLICATIONS

International Search Report from PCT/KR2016/015283, dated Mar. 29, 2017.
(Continued)

*Primary Examiner* — Chi H Pham
*Assistant Examiner* — Weibin Huang
(74) *Attorney, Agent, or Firm* — Dentons US LLP

(57) ABSTRACT

A method for measuring and reporting a D2D resource by a terminal that supports D2D communication according to an embodiment of the present invention comprises the steps of: measuring a resource usage rate of a first link that is being used by the terminal for D2D communication; transmitting a measurement report including the measured resource usage rate to a base station when the measured resource usage rate exceeds a first threshold value or less than a
(Continued)

second threshold value; and receiving resource reallocation information for offloading the D2D communication, from the base station, wherein the resource reallocation information includes probability values indicating probabilities that the first link and the second link, which is configured in a resource different from that of the first link, will be used for the D2D communication, respectively. The terminal may offload the D2D communication performed in the first link onto the second link when the second link is selected through a link selection performed on the basis of the probability values.

12 Claims, 12 Drawing Sheets

(51) Int. Cl.
　　*H04W 28/08* (2009.01)
　　*H04B 17/318* (2015.01)
　　*H04L 12/26* (2006.01)
　　*H04W 72/08* (2009.01)
　　*H04W 72/12* (2009.01)

(52) U.S. Cl.
　　CPC ........... *H04W 24/02* (2013.01); *H04W 28/08* (2013.01); *H04W 72/085* (2013.01); *H04W 72/1263* (2013.01)

(56) References Cited

U.S. PATENT DOCUMENTS

| | | |
|---|---|---|
| 2015/0350867 A1 | 12/2015 | Chaponniere et al. |
| 2016/0037568 A1* | 2/2016 | Hakola ................. H04W 76/14 370/329 |
| 2016/0286571 A1* | 9/2016 | Gattami ................ H04W 76/14 |
| 2016/0337954 A1* | 11/2016 | Gulati .................... H04W 76/14 |
| 2016/0338127 A1* | 11/2016 | Matsumoto ....... H04W 72/0406 |
| 2017/0048875 A1* | 2/2017 | Martin .................... H04L 5/001 |
| 2017/0188410 A1* | 6/2017 | Yaver .................... H04W 28/08 |
| 2018/0206176 A1* | 7/2018 | Panteleev ............ H04B 17/318 |
| 2018/0254842 A1* | 9/2018 | Hua .................... H04W 52/383 |

FOREIGN PATENT DOCUMENTS

| | | |
|---|---|---|
| WO | 2015062671 A1 | 5/2015 |
| WO | 2015173632 A1 | 11/2015 |

OTHER PUBLICATIONS

Written Opinion of the ISA from PCT/KR2016/015283, dated Mar. 29, 2017.
XP051053269: 5G Automotive Vision, 3GPP Draft, 5G White Paper Automotive, 3rd Generation Partnership Project, (3GPP) Nov. 30, 2015, pp. 1-67.

* cited by examiner (a) CONTROL-PLANE PROTOCOL STACK (b) USER-PLANE PROTOCOL STACK (a) in coverage  (b) out-of-coverage  (c) partial coverage METHOD FOR MEASURING AND REPORTING D2D RESOURCE IN WIRELESS COMMUNICATION SYSTEM, AND APPARATUS THEREFOR This application is a 35 use § 371 national stage entry of international application no. PCT/KR2016/015283 filed on Dec. 26, 2016, and claims priority to U.S. provisional application nos. 62/278,970 filed on Jan. 14, 2016 and 62/328,571 filed on Apr. 27, 2016, all of which are hereby incorporated by reference in their entireties as if fully set forth herein.

TECHNICAL FIELD

The present invention relates to a wireless communication system, and more particularly, to a method of measuring and reporting a D2D (device to device) resource in a wireless communication system supporting D2D communication and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

A technical task of the present invention is to provide a method of measuring and reporting a D2D resource to adaptively operate in accordance with a load status of D2D communication and an apparatus therefor.

The present invention is not limited to the above technical problems and other technical objects may be inferred from embodiments of the present invention.

Technical Solution

To achieve the technical task according to one aspect of the present invention, a method of measuring and reporting a D2D resource, which is measured and reported by a user equipment supporting D2D (device to device) communication, includes measuring a resource usage rate of a first link currently used for performing D2D communication, transmitting a measurement report including the measured resource usage rate to a base station when the measured resource usage rate exceeds a first threshold or is less than a second threshold; and receiving resource reallocation information for off-loading the D2D communication from the base station. The resource reallocation information may include a probability value indicating a probability that the first link will be used for the D2D communication, and a probability value indicating a probability that a second link will be used for the D2D communication, the second link being configured in a resource different from a resource of the first link. The user equipment can offload the D2D communication to the second link when the second link is selected as a result of performing a link selection based on the probability values.

To achieve the technical task according to other aspect of the present invention, a user equipment supporting D2D (device to device) communication includes a processor configured to measure a resource usage rate of a first link used by the user equipment for D2D communication, a transmitter configured to transmit, to a base station under control of the processor, a measurement report containing the measured resource usage rate when the measured resource usage rate exceeds a first threshold or is less than a second threshold and a receiver configured to receive, from the base station under control of the processor, resource reallocation information for off-loading the D2D communication.

The resource reallocation information may contain a probability value indicating a probability that the first link will be used for the D2D communication, and a probability value indicating a probability that a second link will be used for the D2D communication, the second link being configured in a resource different from a resource of the first link. The processor may offload the D2D communication to the second link, when the second link is selected as a result of performing a link selection based on the probability values.

The measurement report includes a flag indicating whether the resource usage rate is high or low, if the resource usage rate exceeds the first threshold, the flag is configured as high, and if the resource usage rate is less than the second threshold, the flag can be configured as low.

If the resource usage rate exceeds the first threshold, a probability of selecting the second link is configured to be higher than a probability of selecting the first link and if the resource usage rate is less than the second threshold, the probability of selecting the second link can be configured to be lower than the probability of selecting the first link.

The resource usage rate can be measured using at least one of RSSI (received signal strength indicator), RSRP (reference signal received power), and SA (scheduling assignment) scheduling D2D data which are detected from the first link.

The user equipment estimates an amount of resources allocated for the D2D data via the SA and measures the resource usage rate by dividing the amount of resources allocated for the D2D data by the total amount of D2D resources.

If decoding of the SA fails and RSRP of the SA is less than a threshold, the user equipment can measure the resource usage rate by assuming that there is no resource allocated for the SA and the D2D data.

The total amount of the D2D resources may correspond to remaining resources except a resource in which transmission is performed by the user equipment among a resource region for the D2D data.

Advantageous Effects

According to one embodiment of the present invention, if a UE measures and reports a resource use amount of a link on which D2D communication is performed to a network, the network offloads D2D communication of the UE according to a load status. By doing so, it is able to more smoothly perform the D2D communication and it is able to more efficiently use a limited resource.

Effects obtainable from the present invention are non-limited by the above mentioned effect. And, other unmentioned effects can be clearly understood from the following description by those having ordinary skill in the technical field to which the present invention pertains.

MODE FOR INVENTION

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications. In the present disclosure, a base station (eNB) may be used as a broad meaning including a remote radio head (RRH), an eNB, a transmission point (TP), a reception point (RP), a relay, etc.

Figure 1:
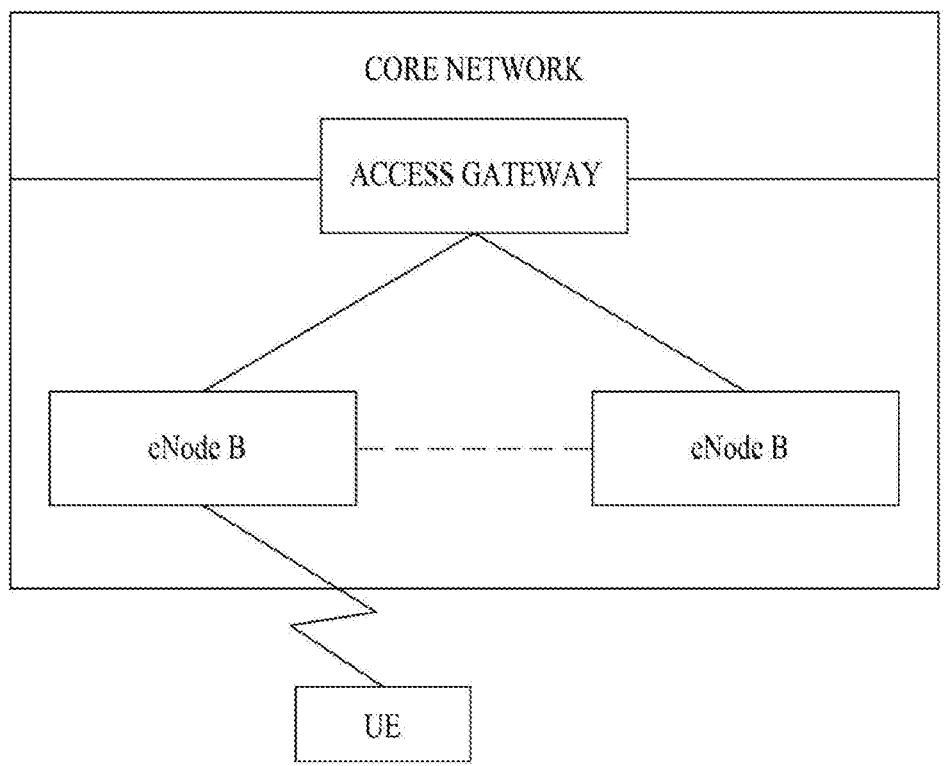
FIG. 1 is a diagram schematically illustrating a network structure of an E-UMTS as an exemplary radio communication system.
Figure 2:
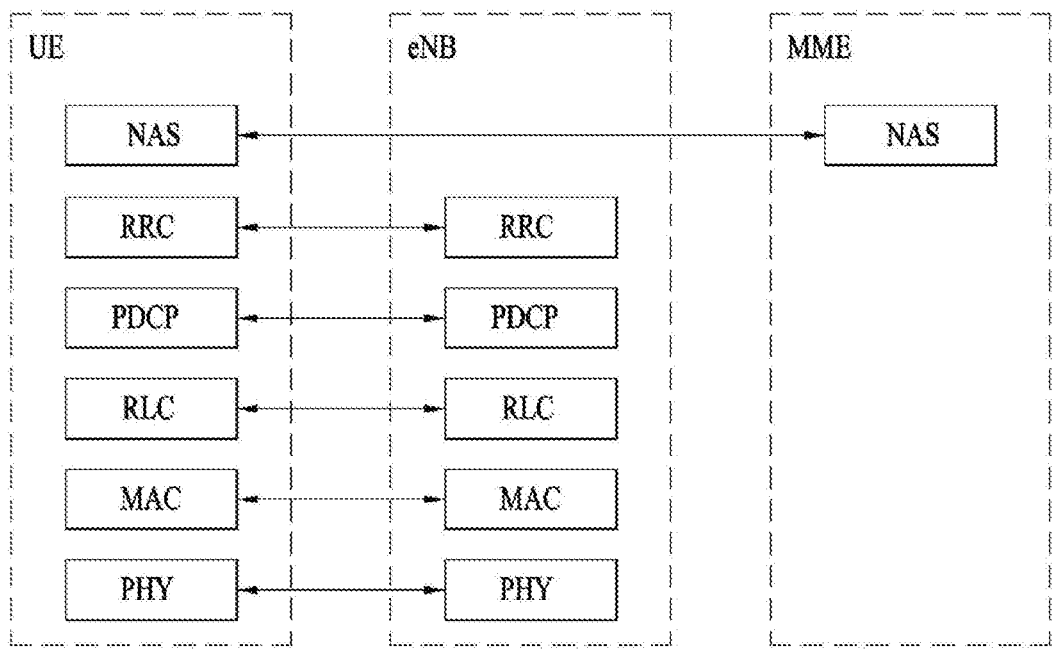
FIG. 2 is a diagram illustrating structures of a control plane and a user plane of a radio interface protocol between a UE and an E-UTRAN based on the 3GPP radio access network specification.
Figure 2:
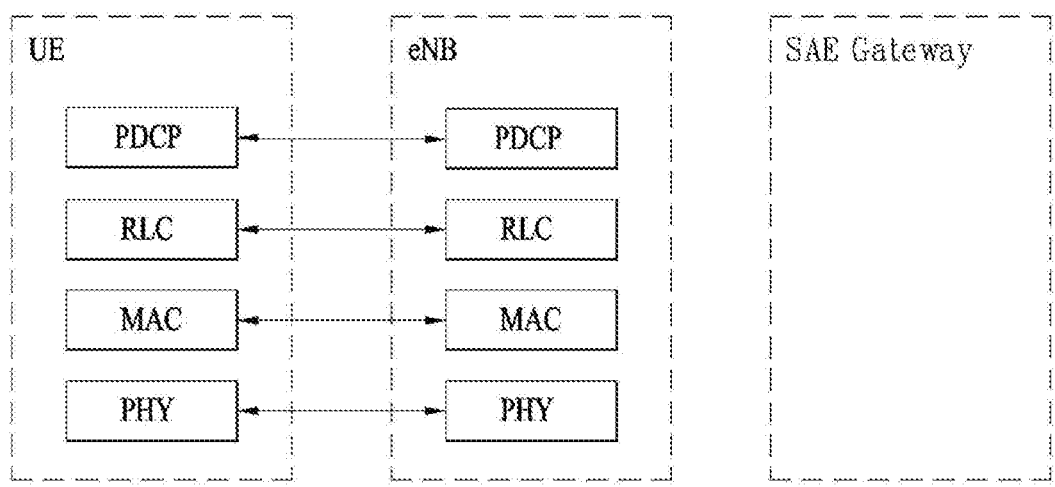

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
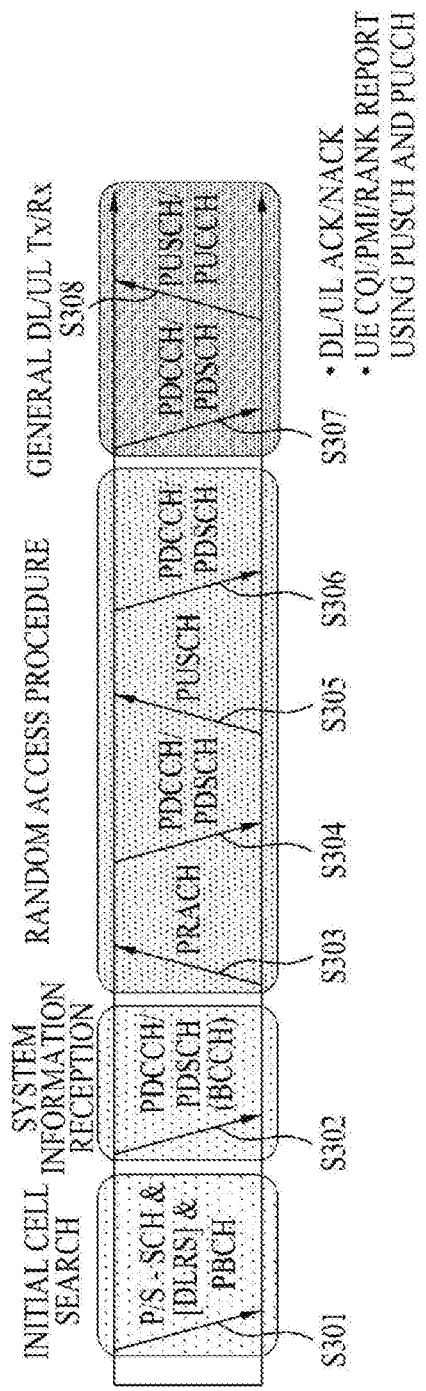
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
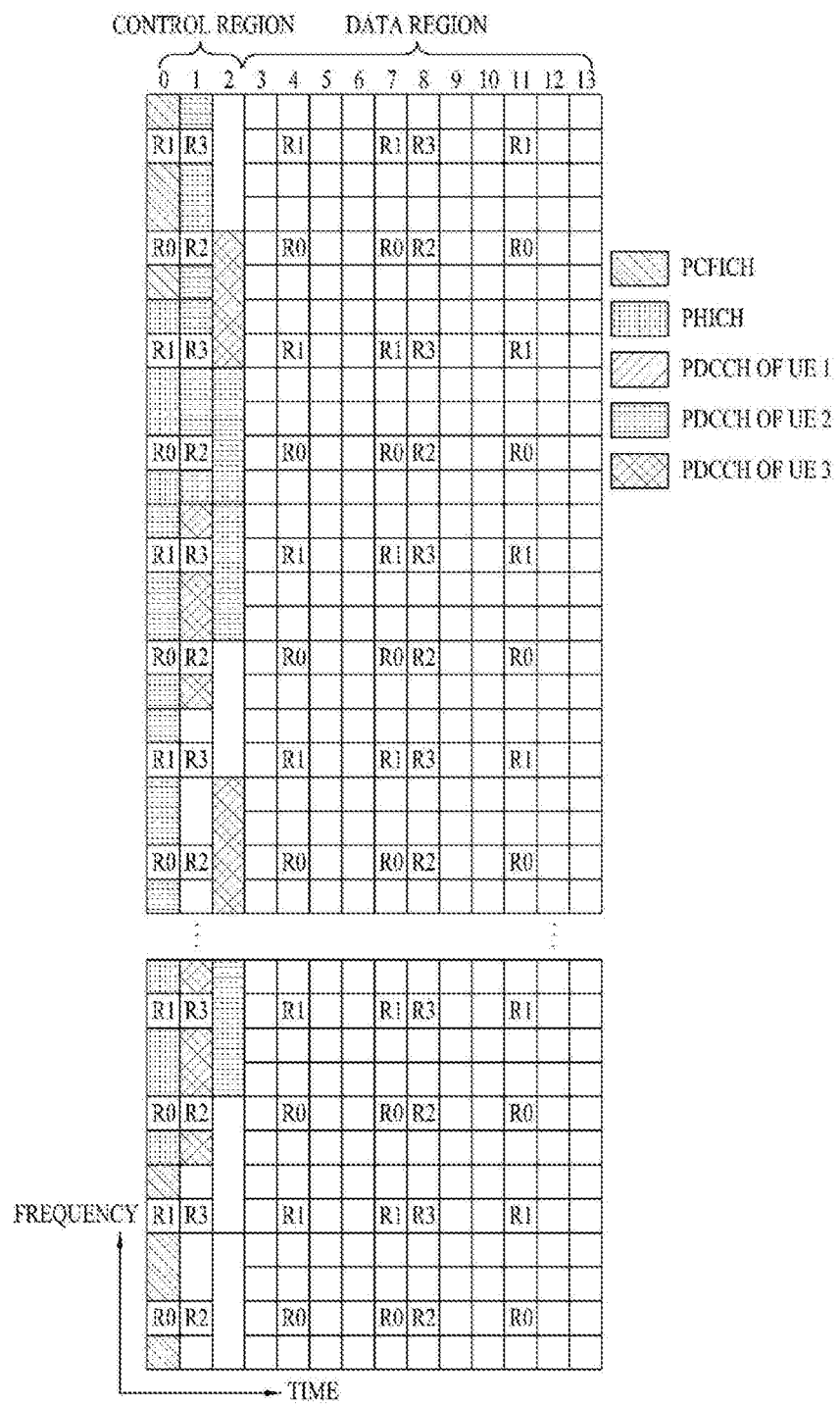
FIG. 4 is a diagram illustrating the structure of a DL radio frame used in an LTE system.

FIG. 4 is a diagram illustrating control channels contained in a control region of one subframe in a DL radio frame.

Referring to FIG. 4, one subframe includes 14 OFDM symbols. The first to third ones of the 14 OFDM symbols may be used as a control region and the remaining 11 to 13 OFDM symbols may be used as a data region, according to subframe configuration. In FIG. 4, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 5:
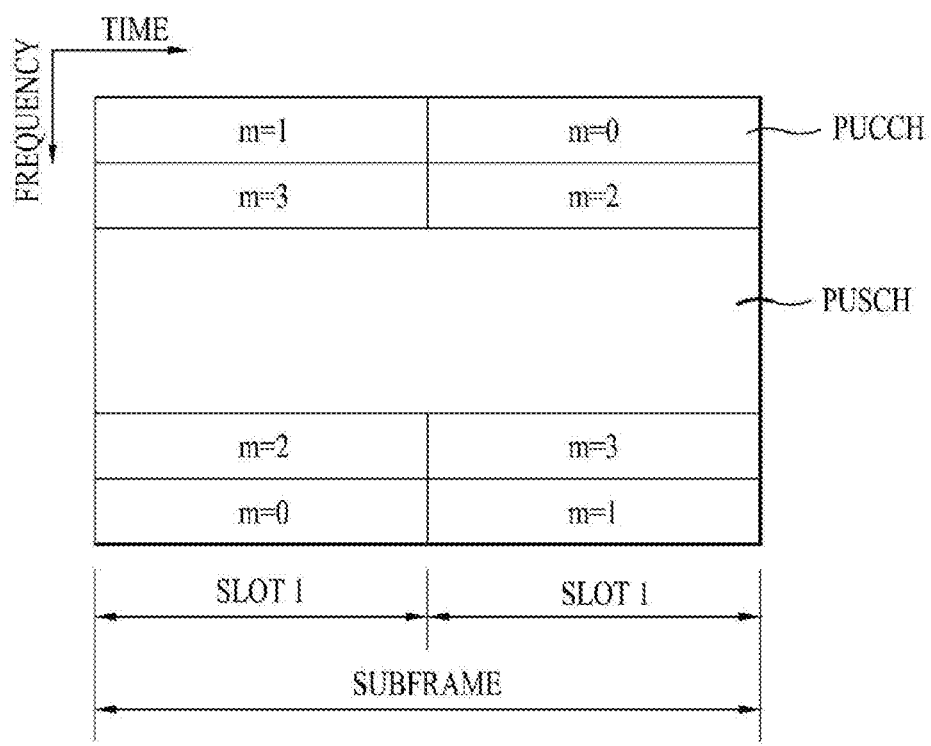
FIG. 5 is a diagram illustrating the structure of a UL subframe in an LTE system.

FIG. 5 is a diagram illustrating the structure of a UL subframe in an LTE system.

Referring to FIG. 5, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 5.

And, time capable of transmitting a sounding reference signal in a subframe corresponds to a symbol period lastly positioned in a subframe in a time axis and the sounding reference signal is transmitted through a data transmission band in frequency axis. Sounding reference signals of a plurality of UEs transmitted through a last symbol of an identical subframe can be distinguished from each other according to a frequency position.

Figure 6:
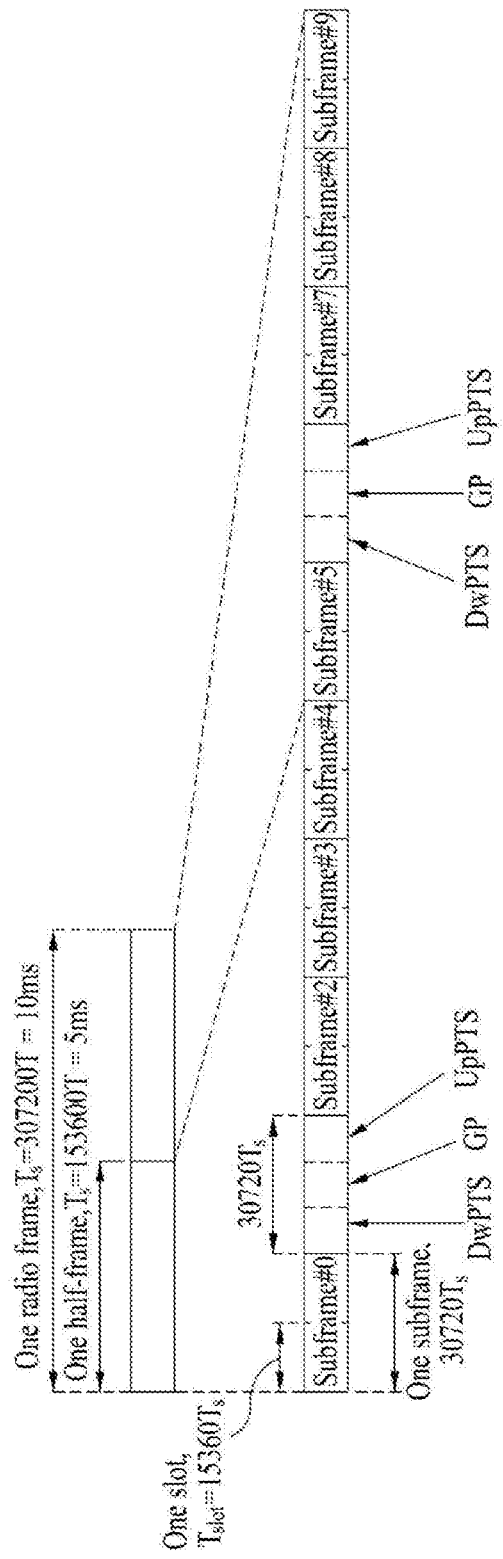
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 1 below.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D, U, and S refer to a downlink subframe, an uplink subframe, and the special subframe. In addition, Table 1 also shows downlink-to-uplink switch-point periodicity in an uplink/downlink subframe configuration in each system.

Figure 7:
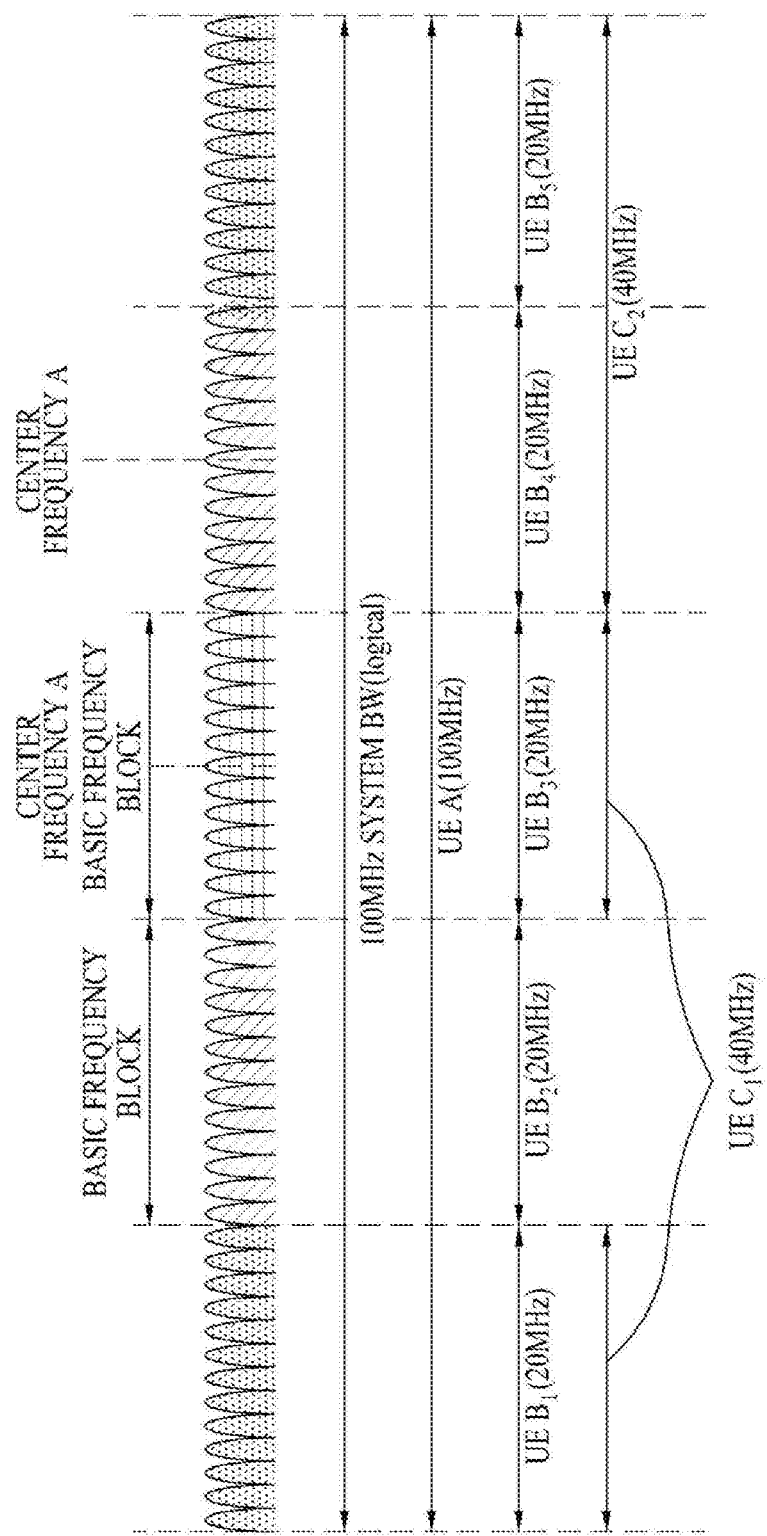
FIG. 7 is a view illustrating concept of a carrier aggregation scheme.

Hereinafter, a carrier aggregation scheme will be described. FIG. 7 is a view illustrating concept of a carrier aggregation scheme.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will consistently used.

Figure 8:
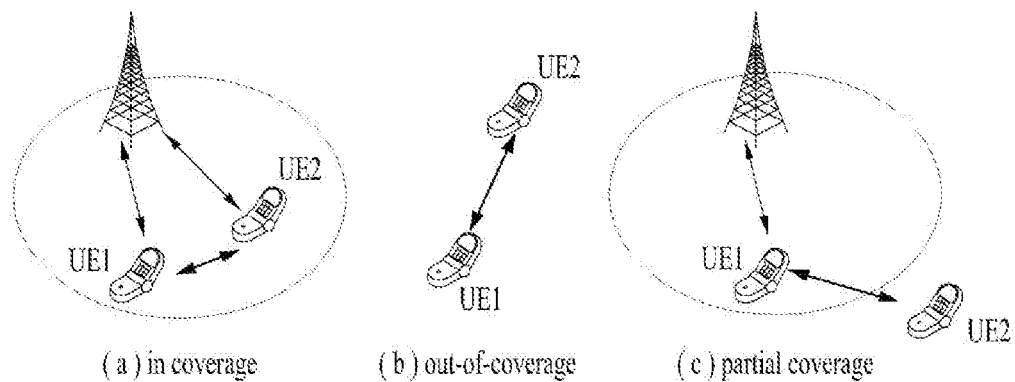
FIG. 8 is a diagram illustrating exemplary scenarios of D2D communication.

Referring to FIG. 7, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 7 illustrates the case in which component carriers have the same bandwidth, the case is purely exemplary, and thus, the component carriers may have different bandwidths. In addition, although FIG. 7 illustrates the case in which the component carriers are adjacent to each other in the frequency domain, FIG. 8 are logically illustrated, and thus, the component carriers may be physically adjacent to each other or may be spaced apart from each other.

Component carriers can use different center frequencies or use one common center frequency with respect to physically adjacent component carriers. For example, in FIG. 8, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers as illustrated in FIG. 7. In this case, a method for scheduling a data channel by a control channel may be classified into a linked carrier scheduling method and a cross carrier scheduling method.

In more detail, in the linked carrier scheduling method, a control channel transmitted through a specific component carrier schedules only a data channel through the specific component carrier like in a legacy LTE system using a single component carrier.

Meanwhile, in the cross carrier scheduling method, a control channel transmitted through a primary component carrier (primary CC) using a carrier indicator field (CIF) schedules a data channel transmitted through a data channel transmitted through the primary CC or a secondary CC.

A description will be given of a method for controlling uplink transmission power in an LTE system.

A method for controlling, by a UE, uplink transmission power thereof includes open loop power control (OLPC) and closed loop power control (CLPC). The former controls power in such a manner that attenuation of a downlink signal from a base station of a cell to which a UE belongs is estimated and compensated for. OLPC controls uplink power by increasing uplink transmission power when downlink signal attenuation increases as a distance between the UE and the base station increases. The latter controls uplink power in such a manner that the base station directly transmits information (i.e. a control signal) necessary to control uplink transmission power.

The following equation 1 is used to determine transmission power of a UE when a serving cell c transmits only a PUSCH instead of simultaneously transmitting the PUSCH and a PUCCH in a subframe corresponding to a subframe index i in a system that supports carrier aggregation.

$$P_{PUSCH,c}(i) = \min \begin{Bmatrix} P_{CMAX,c}(i), \\ 10\log_{10}(M_{PUSCH,c}(i)) + \\ P_{O\_PUSCH,c}(j) + \\ \alpha_c(j) \cdot PL_c + \\ \Delta_{TF,c}(i) + f_c(i) \end{Bmatrix} [dBm] \quad \text{[Equation 1]}$$

The following equation 2 is used to determine PUSCH transmission power when the serving cell c simultaneously transmits the PUCCH and the PUSCH in the subframe corresponding to the subframe index i in a system supporting carrier aggregation.

$$P_{PUSCH,c}(i) = \min \begin{Bmatrix} 10\log_{10}(\hat{P}_{CMAX,c}(i) - \\ \hat{P}_{PUCCH}(i)), \\ 10\log_{10}(M_{PUSCH,c}(i)) + \\ P_{O\_PUSCH,c}(j) + \\ \alpha_c(j) \cdot PL_c + \\ \Delta_{TF,c}(i) + f_c(i) \end{Bmatrix} [dBm] \quad \text{[Equation 2]}$$

Parameters, which will be described in association with Equations 1 and 2, determine uplink transmission power of a UE in the serving cell c. Here, $P_{CMAX,c}(i)$ in Equation 1 indicates maximum transmittable power of the UE in the subframe corresponding to the subframe index i and $\hat{P}_{CMAX,c}(i)$ in Equation 2 indicates a linear value of $P_{CMAX,c}(i)$. $\hat{P}_{PUCCH}(i)$ in Equation 2 indicates a linear value of $P_{PUCCH}(j)$ ($P_{PUCCH}(j)$ indicating PUCCH transmission power in the subframe corresponding to subframe index i).

In Equation 1, $M_{PUSCH,c}(i)$ is a parameter indicating a PUSCH resource allocation bandwidth, which is represented as the number of resource blocks valid for the subframe index i, and is allocated by a base station. $P_{O\_PUSCH,c}(i)$ is a parameter corresponding to the sum of a cell-specific nominal component $P_{O\_NOMINAL\_PUSCH,c}(j)$ provided by a higher layer and a UE-specific component $P_{O\_UE\_PUSCH,c}(j)$ provided by the higher layer and is signaled to the UE by the base station.

j is 1 in PUSCH transmission/retransmission according to an uplink grant and j is 2 in PUSCH transmission/retransmission according to a random access response. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$. Parameters $P_{O\_PRE}$ and $\Delta_{PREAMBLE\_Msg3}$ are signaled by the higher layer.

$\alpha_c(j)$ is a pathloss compensation factor and a cell-specific parameter provided by the higher layer and transmitted as 3 bits by the base station. $\alpha \in \{0, 0.4, 0.5, 0.6, 0.7, 0.8, 0.9, 1\}$ when j is 0 or 1 and $\alpha_c(j)=1$ when j is 2. $\alpha_c(j)$ is a value signaled to the UE by the base station.

Pathloss $PL_c$ is a downlink pathloss (or signal loss) estimate value in dBs, calculated by the UE, and is represented as $PL_c$=referenceSignalPower−higher layer filteredRSRP. Here, referenceSignalPower can be signaled to the UE by the base station via the higher layer.

$f_c(i)$ is a value indicating current PUSCH power control adjustment state for the subframe index i and can be represented as a current absolute value or accumulated value. When accumulation is enabled on the basis of a parameter provided by the higher layer or a TPC command $\delta_{PUSCH,c}$ is included in a PDCCH along with DCI format 0 for the serving cell c in which CRC is scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through the PDCCH with DCI format 0/4 or 3/3A in a subframe i−$K_{PUSCH}$. Here, $f_c(0)$ is the first value after reset of the accumulated value.

$K_{PUSCH}$ is defined in LTE as follows.

For FDD (Frequency Division Duplex), $K_{PUSCH}$ has a value of 4. As to TDD, $K_{PUSCH}$ has values as shown in Table 2.

TABLE 2

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |

TABLE 2-continued

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The UE attempts to decode a PDCCH in DCI format 0/4 with C-RNTI thereof or to decode a PDCCH in DCI format 3/3A and a DCI format for SPS C-RNTI with TPC-PUSCH-RNTI thereof in each subframe in cases other than DRX state. When DCI formats 0/4 and 3/3A for the serving cell c are detected in the same subframe, the UE needs to use $\delta_{PUSCH,c}$ provided in DCI format 0/4. When a TPC command decoded for the serving cell c is not present, DRX is generated or a subframe having index i is a subframe other than an uplink subframe in TDD, $\delta_{PUSCH,c}$ is 0 dB.

Accumulated $\delta_{PUSCH,c}$, which is signaled together with DCI format 0/4 on a PDCCH, is shown in Table 3. When a PDCCH with DCI format 0 is validated through SPS activation or released, $\delta_{PUSCH,c}$ is 0 dB. Accumulated $\delta_{PUSCH,c}$, which is signaled with DCI format 3/3A on a PDCCH, is one of SET1 of Table 3 or one of SET2 of Table 4, determined by a TPC-index parameter provided by the higher layer.

TABLE 3

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 4

| TPC Command Field in DCI format 3A | Accumulated $\delta_{PUSCH,c}$ [dB] |
|---|---|
| 0 | −1 |
| 1 | 1 |

When the UE reaches maximum transmission power $\hat{P}_{CMAX}(i)$ in the serving cell c, a positive TPC command is not accumulated for the serving cell c. Conversely, when the UE reaches minimum transmission power, a negative TPC command is not accumulated.

The following equation 3 is related to uplink power control with respect to a PUCCH in LTE.

$$P_{PUCCH}(i) = \min \begin{Bmatrix} P_{CMAX,c}(i), \\ P_{0\_PUCCH} + PL_c + \\ h(n_{CQI}, n_{HARQ}, n_{SR}) + \\ \Delta_{F\_PUCCH}(F) + \\ \Delta_{TxD}(F') + g(i) \end{Bmatrix} [dBm] \quad \text{[Equation 3]}$$

In Equation 3, i indicates a subframe index and c indicates a cell index. When a UE is configured by a higher layer to transmit a PUCCH over through antenna ports, $\Delta_{TxD}(F')$ is provided to the UE by the higher layer. In other cases, $\Delta_{TxD}(F')$ is 0. Parameters with respect to a cell having the cell index c will now be described.

$P_{CMAX,c}(i)$ indicates maximum transmission power of a UE, $P_{O\_PUCCH}$ is a parameter corresponding to the sum of cell-specific parameters and signaled by a base station through higher layer signaling, $PL_c$ is a downlink pathloss (or signal loss) estimate value calculated in dBs by the UE and is represented as $PL_c$=referenceSignalPower−higher layer filteredRSRP. h(n) is a value depending on PUCCH format, $n_{CQI}$ is the number of information bits with respect to channel quality information (CQI) and $n_{HARQ}$ indicates the number of HARQ bits. In addition, $\Delta_{F\_PUCCH}(F)$ is a relative value with respect to PUCCH format 1a and a value corresponding to PUCCH format # F, which is signaled by the base station through higher layer signaling. g(i) indicates a current PUCCH power control adjustment state of a subframe having index i.

g(0)=0 when $P_{O\_UE\_PUCCH}$ is changed in the higher layer and g(0)=$\Delta P_{rampup} \alpha \delta_{msg2}$ otherwise. $\delta_{msg2}$ is a TPC command indicated in a random access response $\Delta P_{rampup}$ corresponds to total power ramp-up from the first to last preambles, provided by the higher layer.

When a UE reaches maximum transmission power $P_{CMAX,c}(i)$ in a primary cell, a positive TPC command is not accumulated for the primary cell. When the UE reaches minimum transmission power, a negative TPC command is not accumulated. The UE resets accumulation when $P_{O\_UE\_PUCCH}$ is changed by the higher layer or upon reception of a random access response.

Tables 5 and 6 show $\delta_{PUCCH}$ indicated by a TPC command in DCI formats. Particularly, Table 5 shows $\delta_{PUCCH}$ indicated in DCI formats other than DCI format 3A and Table 6 shows $\delta_{PUCCH}$ indicated in DCI format 3A.

TABLE 5

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 6

| TPC Command Field in DCI format 3A | $\delta_{PUCCH}$ [dB] |
|---|---|
| 0 | −1 |
| 1 | 1 |

Equation 4 in the following corresponds to an equation related to power control of a sounding reference signal (SRS) in LTE system.

$$P_{SRS,c}(i) = \min \begin{Bmatrix} P_{CMAX,c}(i) \\ P_{SRS\_OFFSET,c}(m) + \\ 10\log_{10}(M_{SRS,c}) + \\ P_{O\_PUSCH,c}(j) + \\ \alpha_c(j) \cdot PL_c + f_c(i) \end{Bmatrix} [dBm] \quad \text{[Equation 4]}$$

In Equation 4, i corresponds to a subframe index and c corresponds to a cell index. In this case, $P_{CMAX,c}(i)$ corresponds to maximum power capable of being transmitted by a UE and $P_{SRS\_OFFSET,c}(m)$ corresponds to a value configured by an upper layer. If m is 0, it may correspond to a case of transmitting a periodic sounding reference signal. If m is not 0, it may correspond to a case of transmitting an aperiodic sounding reference signal. $M_{SRS,c}$ corresponds to a sounding reference signal bandwidth on a subframe index i of a serving cell c and is represented by the number of resource blocks.

$f_c(i)$ corresponds to a value indicating a current PUSCH power control adjustment status for a subframe index i of a serving cell c. $P_{O\_PUSCH,c}(j)$ and $\alpha_c(j)$ are also identical to what is mentioned earlier in Equation 1 and 2.

Hereinafter, a Sounding Reference Signal (SRS) will be described.

The SRS is composed of constant amplitude zero auto correlation (CAZAC) sequences. SRSs transmitted from several UEs are CAZAC sequences $r^{SRS}(n)=r_{u,v}^{(\alpha)}(n)$ having different cyclic shift values a according to Equation 1.

$$\alpha = 2\pi \frac{n_{SRS}^{cs}}{8} \qquad \text{[Equation 5]}$$

where, $n_{SRS}^{cs}$ is a value set to each UE by a higher layer and has an integer value of 0 to 7. Accordingly, the cyclic shift value may have eight values according to $n_{SRS}^{cs}$.

CAZAC sequences generated from one CAZAC sequence through cyclic shift have zero correlation values with sequences having different cyclic shift values. Using such property, SRSs of the same frequency domain may be divided according to CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

Hereinafter, a detailed method of mapping physical resources for transmitting SRSs in an LTE system will be described.

In order to satisfy transmit power $P_{SRS}$ of a UE, an SRS sequence $r^{SRS}(n)$ is first multiplied by an amplitude scaling factor $\beta_{SRS}$ and is then mapped to a resource element (RE) having an index (k, l) from $r_{SRS}$ by Equation 6.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \qquad \text{[Equation 6]}$$

where, $k_0$ denotes a frequency domain start point of an SRS and is defined by Equation 7.

$$k_0 = k_0' + \sum_{b=0}^{B_{SRS}} 2M_{sc,b}^{RS} n_b \qquad \text{[Equation 7]}$$

where, $n_b$ denotes a frequency location index. $k_0'$ for a general uplink subframe is defined by Equation 8 and $k_0'$ for an uplink pilot time is defined by Equation 9.

$$k_0' = (\lfloor N_{RB}^{UL}/2 \rfloor - m_{SRS,0}/2)N_{SC}^{RB} + k_{TC} \qquad \text{[Equation 8]}$$

-continued $$k_0' = \begin{cases} (N_{RB}^{UL} - m_{SRS,0}^{max})N_{sc}^{RB} + k_{TC} & \text{if } ((n_f \bmod 2) \times \\ & (2 - N_{SP}) + \\ & n_{hf}) \bmod 2 = 0 \\ k_{TC} & \text{otherwise} \end{cases} \qquad \text{[Equation 9]}$$

In Equations 8 and 9, $k_{TC}$ denotes a transmissionComb parameter signaled to a UE via a higher layer and has a value of 0 or 1. In addition, $n_{hf}$ is 0 in an uplink pilot time slot of a first half frame and is 0 an uplink pilot slot of a second half frame. $M_{sc,b}^{RS}$ is the length, that is, the bandwidth, if the SRS sequence expressed in subcarrier units defined by Equation 10.

$$M_{sc,b}^{RS} = m_{SRS,b} N_{sc}^{RB}/2 \qquad \text{[Equation 10]}$$

In Equation 10, $m_{SRS,b}$ is a value signaled from an eNB according to an uplink bandwidth $N_{RB}^{UL}$.

The UE may perform frequency hopping of the SRS so as to transmit the SRS with the overall uplink data transmission bandwidth. Such frequency hopping is set by a parameter $b_{hop}$ having a value of 0 to 3 received from a higher layer.

If frequency hopping of the SRS is inactivated, that is, if $b_{hop} \geq B_{SRS}$, a frequency location index $n_b$ has a constant value as shown in Equation 11. Here, $n_{RRC}$ is a parameter received from a higher layer.

$$n_b = \lfloor 4n_{RRC}/m_{SRS,b} \rfloor \bmod N_b \qquad \text{[Equation 11]}$$

Meanwhile, if frequency hopping of the SRS is activated, that is, $b_{hop} < B_{SRS}$ a frequency location index $n_b$ is defined by Equations 12 and 13.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \qquad \text{[Equation 12]}$$

$$F_b(n_{SRS}) = \qquad \text{[Equation 13]}$$

$$\begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + & \text{if } N_b \text{ even} \\ \\ \left\lfloor \frac{n_{SRS} \bmod \prod_{b'=b_{hop}}^{b} N_{b'}}{2 \prod_{b'=b_{hop}}^{b-1} N_{b'}} \right\rfloor \\ \\ \lfloor N_b/2 \rfloor \left\lfloor n_{SRS} / \prod_{b'=b_{hop}}^{b-1} N_{b'} \right\rfloor & \text{if } N_b \text{ odd} \end{cases}$$

where, $n_{SRS}$ is a parameter used to calculate the number of times of transmitting the SRS and is defined by Equation 14.

$$n_{SRS} = \begin{cases} 2N_{SP}n_f + 2(N_{SP} - 1)\left\lfloor \frac{n_s}{10} \right\rfloor + & \text{for } 2msSRSperiodicityofTDDframestructure \\ \left\lfloor \frac{T_{offset}}{T_{offset\_max}} \right\rfloor, \\ \lfloor (n_f \times 10 + \lfloor n_s/2 \rfloor)/T_{SRS} \rfloor, & \text{otherwise} \end{cases} \qquad \text{[Equation 14]}$$

In Equation 14, $T_{SRS}$ denotes the periodicity of an SRS and $T_{offset}$ denotes a subframe offset of an SRS. In addition, $n_s$ denotes a slot number and $n_f$ denotes a frame number.

A UE-specific SRS configuration index $I_{SRS}$ for setting the periodicity $T_{SRS}$ and the subframe offset $T_{offset}$ of a UE-specific SRS signal is shown in Table 7-Table 10 according to FDD and TDD. In particular, Table 7 and Table 8 indicate a FDD system and a TDD system, respectively. Table 7 and Table 8 in the following show a period related to a triggering type 0, i.e., a periodic SRS, and offset information.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 8

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

Meanwhile, in case of the periodic SRS, transmission is performed in a subframe satisfying Equation 15 in the following in a FDD system or a TDD system where $T_{SRS}$ is greater than 2 ($T_{SRS}$>2). Yet, in Equation 15, $k_{SRS}$ corresponds to {0, 1, ..., 9} in case of the FDD system, whereas $k_{SRS}$ is determined according to Table 9 in the following in case of the TDD system.

$$(10 \cdot n_f + k_{SRS} - T_{offset}) \bmod T_{SRS} = 0 \quad \text{[Equation 15]}$$

Table 10 and Table 11 in the following show a period related to a triggering type 1, i.e., an aperiodic SRS, and offset information. In particular, Table 10 and Table 11 indicate a FDD system and a TDD system, respectively.

TABLE 10

| SRS Configuration Index $I_{SRS}$ | SRS Periodicity $T_{SRS,1}$ (ms) | SRS Subframe Offset $T_{offset,1}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-31 | reserved | reserved |

TABLE 11

| SRS Configuration Index $I_{SRS}$ | SRS Periodicity $T_{SRS,1}$ (ms) | SRS Subframe Offset $T_{offset,1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-31 | reserved | reserved |

Meanwhile, if a triggering bit of the aperiodic SRS is detected in a subframe # n, an aperiodic SRS corresponding to the triggering bit is transmitted in a first subframe satisfying Equation 17 or Equation 18 in the following appearing after a subframe index # n+k (where k≥4). In particular, Equation 17 in the following is used for a FDD system or a TDD system of which $T_{SRS}$ is greater than 2 ($T_{SRS}$>2) in the Table 11. Equation 18 in the following is used for a TDD system of which $T_{SRS}$ is equal to 2 ($T_{SRS}$=2) in the Table 11. Yet, in case of the FDD system, $k_{SRS}$ corresponds to {0, 1, ..., 9}. In case of the TDD system, $k_{SRS}$ is determined according to the Table 9.

$$(10 \cdot n_f + k_{SRS} - T_{offset,1}) \bmod T_{SRS,1} = 0 \quad \text{[Equation 17]}$$

$$(k_{SRS} - T_{offset,1}) \bmod 5 = 0 \quad \text{[Equation 18]}$$

TABLE 9

| | subframe index n | | | | | | | | | | | |
|---|---|---|---|---|---|---|---|---|---|---|---|---|
| | | 1 | | | | | 6 | | | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | | 1 | | 2 | 3 | 4 | | 6 | | 7 | 8 | 9 |

And, in case of a TDD system where $T_{SRS}$ corresponds to 2 in Table 8, transmission is performed in a subframe satisfying Equation 16 in the following.

$$(k_{SRS} - T_{offset}) \bmod 5 = 0 \quad \text{[Equation 16]}$$

D2D (Device to Device) Communication

In the following, D2D communication based on LTE system is explained. D2D can be referred to as direct communication between UEs or a sidelink. In general, a UE corresponds to a terminal of a user. If such a network device as an eNB transmits and receives a signal according to a D2D communication scheme, the network device can also be considered as a UE as well.

FIG. 8 is a diagram illustrating exemplary scenarios of D2D communication. D2D resources can be allocated from a UL resource (e.g., In case of FDD, a UL frequency resource. In case of TDD, a UL subframe). (a) In case of in-coverage D2D communication, a network controls D2D resources used for D2D communication. The network may allocate a specific resource to a transmission UE or may allocate a pool of D2D resources capable of being selected by a UE. (b) In case of out-of-coverage D2D communication, since a network is unable to directly control a D2D resource, a UE uses a preconfigured D2D resource. (c) In case of partial coverage D2D communication, a UE, which is located at the outside of the coverage, is able to use preconfigured parameters. On the contrary, a UE, which is located within the coverage, is able to use a D2D resource obtained from the network.

For clarity, assume that a UE1 selects a resource unit (RU) corresponding to a specific D2D resource from a resource pool and the UE1 transmits a D2D signal using the selected RS. A resource pool corresponds to a set of D2D resources. Assume that a UE2 corresponding to a reception UE receives information on a resource pool in which the UE1 is able to transmit a signal and detects a signal of the UE1 in the resource pool. In this case, if the UE1 is located within a connection range of an eNB, the eNB can inform the UE1 of information on the resource pool. If the UE1 is located at the outside of the connection range of the eNB, the resource pool can be informed by a different UE or can be determined by a predetermined resource. In general, a resource pool includes a plurality of RUs. A UE selects one or more RUs and may be able to use the selected RUs for transmitting a D2D signal of the UE.

Figure 9:
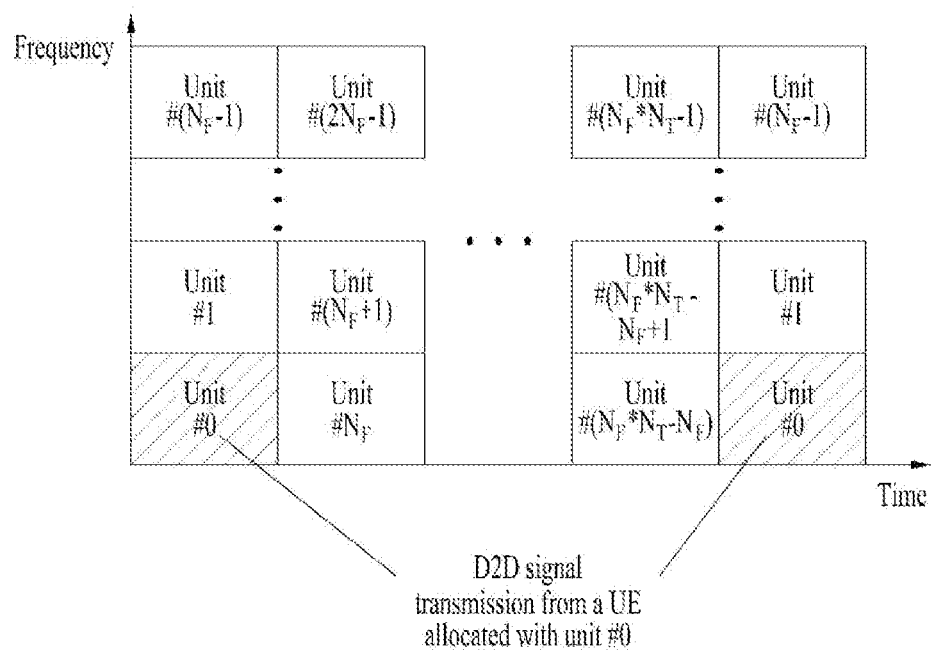
FIG. 9 is a diagram illustrating an example of a D2D RU.

FIG. 9 is a diagram illustrating an example of a D2D RU. For clarity, assume that the entire frequency resources are divided into the $N_F$ number of resource units and the entire time resources are divided into the $N_T$ number of resource units.

In FIG. 9, a resource pool can be repeated with a period of $N_T$ subframes. For example, as shown in FIG. 9, one resource unit may periodically and repeatedly appear.

Or, an index of a physical RU to which a logical RU is mapped may change based on a predetermined pattern over time to obtain a diversity gain in time domain and/or frequency domain. In this RU structure, a resource pool may correspond to a set of resource units capable of being used by a UE intending to transmit a D2D signal.

The aforementioned resource pool can be classified into various types. For example, the resource pool can be classified according to contents of a D2D signal transmitted via each resource pool. For example, the contents of the D2D signal can be classified as follows and a separate resource pool can be configured according to contents of each D2D signal.

Scheduling assignment (SA): The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical RU in a manner of being multiplexed with D2D data. In this case, an SA resource pool may correspond to a pool of resources that an SA and D2D data are transmitted in a manner of being multiplexed. The SA can be referred to as an SCI (side link control channel) and can be transmitted via a D2D control channel (e.g., PSCCH).

D2D data channel: The D2D data channel corresponds to a channel for transmitting user data scheduled by the SA. It may be able to configure a pool of resources for the D2D data channel.

Discovery channel: The discovery channel corresponds to a channel for transmitting a discovery signal including information on an ID of a transmission UE, and the like to enable a neighboring UE to discover the transmission UE. It may be able to configure a resource pool for the discovery channel.

Meanwhile, although contents of D2D signal are identical to each other, it may use a different resource pool according to a transmission/reception attribute of the D2D signal. For example, in case of a D2D data channel of the same type or a discovery channel of the same type, the D2D data channel or the discovery channel can be transmitted in a different resource pool in consideration of (i) a transmission timing determination scheme of a D2D signal (e.g., whether a D2D signal is transmitted at the time of receiving a synchronization reference signal or the timing to which a prescribed timing advance is added), (ii) a resource allocation scheme (e.g., whether a transmission resource of an individual D2D signal is designated by an eNB or a transmission UE autonomously selects a D2D signal transmission resource from a resource pool), (iii) a signal format (e.g., number of symbols occupied by a D2D signal in a subframe, number of subframes used for transmitting a D2D signal), (iv) signal strength from an eNB, (v) strength of transmit power of a D2D UE, and the like.

As mentioned in the foregoing description, such a term as 'D2D' can also be referred to as 'SL (side link)' and 'SA' can also be referred to as PSSCH (physical sidelink control channel). A D2D synchronization signal can be referred to as an SSS (sidelink synchronization signal) and the SSS can be transmitted via a PSBCH (physical sidelink broadcast channel). The PSBCH transmits most basic information (e.g., system information such as SL-MIB, etc.) prior to D2D communication and can also be referred to as a PD2DSCH (physical D2D synchronization channel). A UE transmits a signal (e.g., a discovery signal including an ID of the UE) to a neighboring UE using a discovery channel to inform the neighboring UE of the existence of the UE. The discovery channel is referred to as a PSDCH (physical sidelink discovery channel).

D2D communication of a narrow sense can be distinguished from D2D discovery. For example, if only a UE performing the D2D communication of a narrow sense transmits PSBCH together with SSS (except a UE performing D2D discovery), the SSS can be measured using a DMRS of the PSBCH. An out-of-coverage UE measures the DMRS of the PSBCH (e.g., RSRP, etc.) and may be then able to determine whether or not the UE becomes a synchronization source based on a measurement result.

Figure 10:
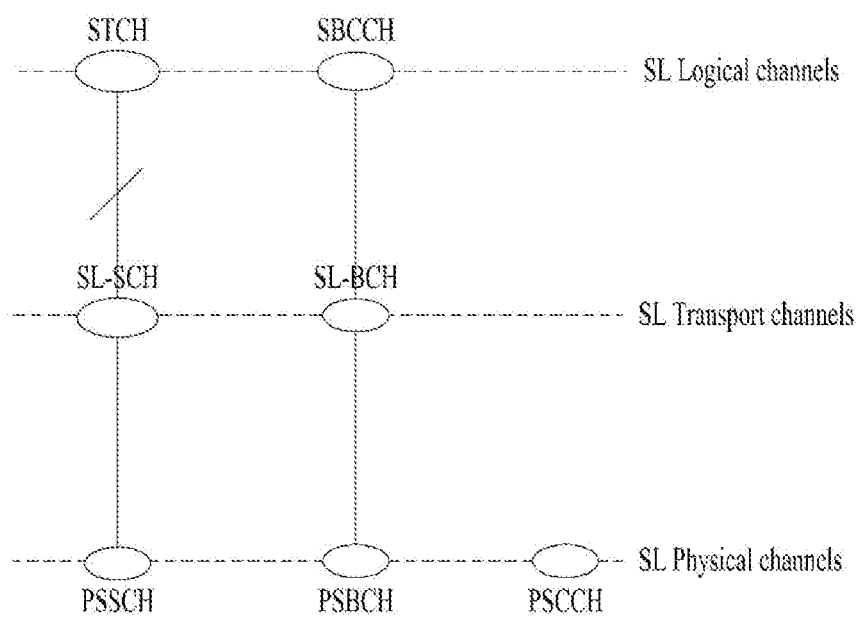
FIG. 10 is a diagram illustrating SL (side link) channels.

FIG. 10 is a diagram illustrating SL (side link) channels. The SL channels shown in FIG. 9 may correspond to channels for performing D2D communication (e.g., D2D communication of a narrow sense).

Referring to FIG. 10, STCH (SL traffic channel) and SBCCH (SL broadcast control channel) correspond to logical channels. The STCH transmits user data received from an application and is connected with SL-SCH (SL shared channel). The SL-SCH corresponding to a transport channel is connected with PSSCH (physical SL shared channel). The SC-SCH signals information necessary for performing synchronization in out-of-coverage or partial coverage scenario or information necessary for performing synchronization between UEs belonging to a different cell. The SBCCH is connected with SL-BCH corresponding to a transport channel. The SC-BCH is connected with PSBCH.

PSCCH (physical SL control channel) performs a role similar to a role of PDCCH in legacy communication performed between a UE and an eNB. The PSCCH is used to transmit SA (scheduling assignment). The SA can also be referred to as SCI (sidelink control information).

For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

For example, in the mode 1, an eNB designates a resource to be used for D2D communication in a resource pool. In the mode 2, a UE selects a resource pool from a set of allocated resource pools and may be able to directly select a D2D resource to be used from the selected resource pool. Hence, it is necessary for the UE to be in an RRC connected state in the mode 1. On the contrary, the UE may be in an RRC idle state or an out-of-coverage state in the mode 2.

Figure 11:
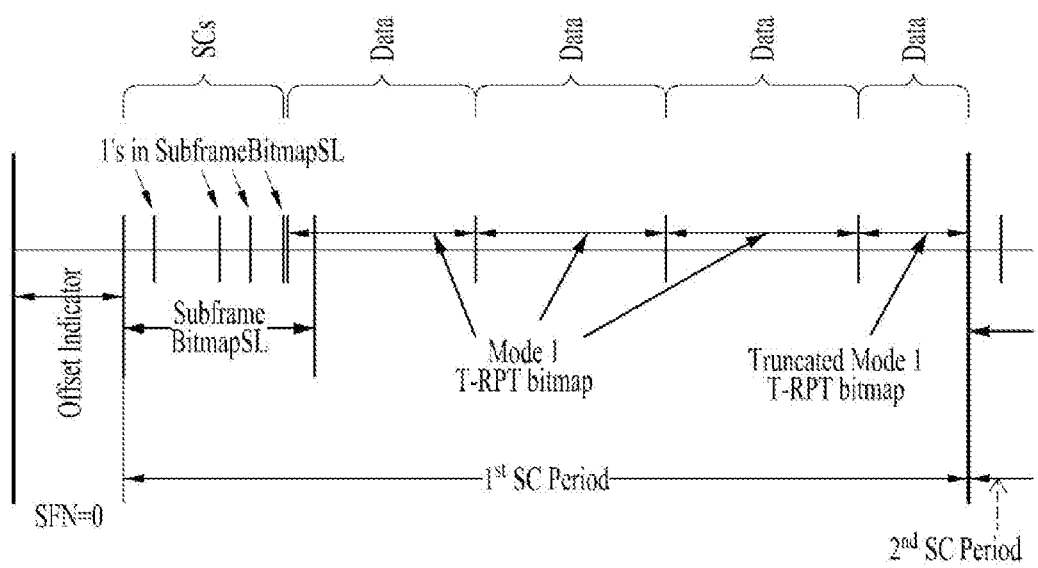
FIG. 11 is a diagram illustrating a D2D communication mode 1.

FIG. 11 is a diagram illustrating a D2D communication mode 1. According to a PSSCH/PSSCH structure for performing D2D communication, a set of subframes (i.e., a subframe bitmap) is divided into two regions (e.g., a control region and a data region). Whether or not a subframe is usable for D2D communication can be indicated via a subframe bitmap.

Referring to FIG. 11, an SC period (SL control period) starts from an offset of SFN=0 and can be periodically repeated. The SC period starts from a control region including SCI transmitted by PSCCH and 'SubframeBitmapSL' corresponding to a higher layer parameter indicates a subframe in which PSCCH is transmitted. A data region starts after the last bit configured by 1 in the 'SubframeBitmapSL'. The data region corresponds to a T-RPT bitmap corresponding to a different bitmap. The T-RPT bitmap indicates subframes in which data is transmitted. As shown in FIG. 11, a subframe pattern indicated by the T-RPT bitmap is repeated until the SC period ends. The last T-RPT bitmap is truncated according to the end of the SC-period. The T-RPT bitmap can be dynamically configured and can be differently configured according to each SC-period and each UE.

In most part, the mode 2 operates in a manner of being similar to the mode 1 shown in FIG. 11. Yet, there is a difference between the mode 1 and the mode 2 in that a start point of a data region is not determined based on SubframeBitmapSL in the mode 2. In the mode 2, the start point of the data region has a fixed offset from a start point of an SC period.

Measurement and Report for D2D/V2X Collision Avoidance

In a legacy cellular network based on communication between an eNB and a UE, the UE can measure/report link quality between the UE and a serving eNB to perform link adaptation such as configuration and change of a transmission mode, MCS, and a precoding matrix. The UE performs/compares serving cell measurement and neighboring cell measurement for the purpose of handover and the like and can report a measurement result to the eNB. For example, the UE measures an eNB-UE link to perform DL transmission, handover, and the like and the eNB performs resource management on each UE based on the measurement report.

As mentioned in the foregoing description, in D2D communication, a D2D UE selects a random resource from a time/frequency resource region defined in advance or a time/frequency resource region indicated by an eNB and transmits/receives a D2D discovery/D2D communication signal via the selected resource (e.g., Mode 2 communication, Type 1 discovery).

In the following, such a term as D2D may mean device to device communication that performs direct transmission and reception. The D2D can be comprehended as a concept including V2X (vehicle to everything) (e.g., V2I V2V (vehicle-to-vehicle), V2P (vehicle-to-person), P2V (person-to-vehicle), etc.).

Figure 12:
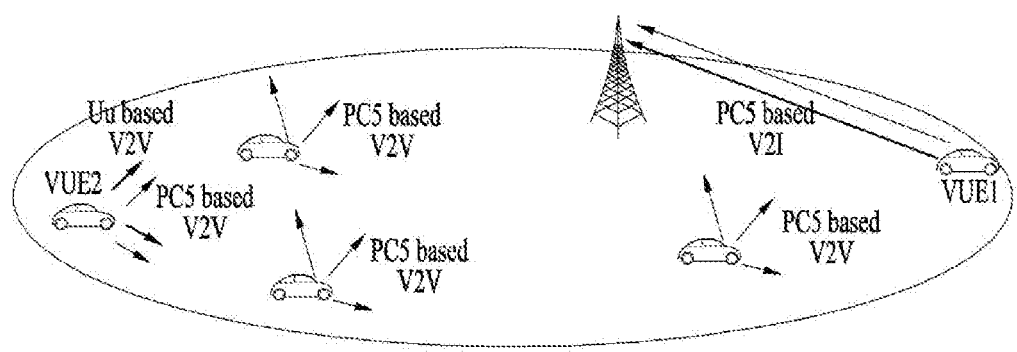
FIG. 12 illustrates an example of D2D communication.

FIG. 12 illustrates an example of D2D communication, more specifically, V2X communication (e.g., V2V, V2I).

In FIG. 12, a PC 5 link may correspond to a link which is configured by allocating a part of cellular uplink resources for D2D communication. And, a Uu link corresponds to a link configured for performing communication between an eNB and a UE in a legacy cellular system.

For clarity, FIG. 12 illustrates D2D communication between an eNB and a VUE (vehicle UE), by which the present invention may be non-limited. For example, D2D communication described in the following can include communication between an RSU (road-side unit) on a road and a vehicle.

In FIG. 12, assume that a V2I/V2V supports both (i) a link (e.g., Uu link) configured in a resource for a legacy cellular usage and (ii) a link (e.g., PC 5 link) configured in a resource for a D2D usage. For example, assume that V2I and V2V communication are performed using the Uu link and/or the PC 5 link.

If a network increases a Uu-based V2I resource (e.g., V2I resource configured on a Uu link) for a VUE1 and a VUE2, since an available D2D resource (e.g., V2I/V2V resource) increases in the aspect of the VUE1 and the VUE2, it may reduce a collision between D2D pairs. However, since the Uu link basically corresponds to a resource for performing cellular communication (e.g., communication between an eNB and a UE), if V2I resource increases in the Uu link, a resource for performing cellular communication is reduced and it is difficult for a cellular network to smoothly operate.

On the other hand, if V2I is mainly performed in a PC 5 link resource, a collision may occur between a V2I resource and a V2V resource. For example, when a V2I transmission UE performs V2V communication with V2V UEs located in the vicinity of the V2I transmission UE, the V2I may act as strong interference to the V2V communication. As a result, V2V performance can be degraded.

The abovementioned resource shortage problem and the collision problem may similarly occur in the V2V communication shown in FIG. 12. For example, when many UEs, which perform V2V communication based on a PC5, are located in the vicinity of a UE (e.g., a VUE2) intending to perform V2V communication, if the VUE2 performs V2V communication via a PC5 link, a collision occurrence probability increases between V2V communications. On the other hand, if a resource for V2V communication is allocated to the VUE2 on a Uu link, it may have a problem in utilizing a cellular uplink resource.

Hence, if load of the PC5 link or the Uu link exceeds a prescribed criterion, it is necessary to have a method of allocating an additional resource for traffic offloading. A procedure for allocating the additional resource should adaptively operate according to a load status of each link.

In the following, a method for a UE to measure a specific resource/specific link and report a measurement result to a network or a device performing resource scheduling is explained to solve the aforementioned problem. The network can allocate an additional resource or collect a surplus resource.

Measurement

First of all, a measurement method for determining whether or not a specific link or a resource is currently used is explained. A measurement reference value (e.g., a threshold for measuring a resource use) proposed in the following can be defined in advance or signaled by a network. A UE can use a measurement result not only for a reporting usage but also for a standard of judgement for autonomously selecting a D2D resource.

1. Signal Strength or Reception Signal Power

For example, similar to legacy RSSI and RSRP, measurement of signal strength/reception power can be applied to a D2D resource as well.

The RSRP may correspond to reception power of an RS for demodulating a D2D signal or reception power for a D2D synchronization signal. And, whether or not a measured RSRP is valid can be determined according to whether or not decoding is successfully performed on a signal using an RS used for measuring the RSRP. For example, when a UE measures RSRP of a first signal and data associated with the first signal is successfully decoded, it is able to determine that RSRP measurement of the first signal is valid. On the other hand, when a UE measures RSRP of a second signal, if the UE fails to decode data associated with the second signal, it is able to determine that RSRP measurement of the second signal is invalid. An invalid measurement result can be identically regarded as a case of not performing measurement. A UE may not report the invalid measurement result to a network. If there is no condition for validity, the UE can report a measurement result of reception signal strength/reception power for an RS to the network irrespective of whether or not there is data associated with the RS.

The RSSI can be interpreted as reception signal strength per unit resource used for measurement.

Signal strength can be measured according to an OFDM symbol. Or, it may be able to induce signal strength according to a subframe by measuring the signal strength according to a symbol.

In particular, when a signal strength value is measured in time domain, the signal strength value can be used for identifying approximate resource use state. For example, a resource use state can be determined based on a measured value (e.g., RSSI/RSRP) and a specific threshold. Specifically, if an energy detection result (e.g., RSSI) in a specific subframe exceeds a specific threshold, it may be able to determine that resources used for measuring RSSI are occupied more than X %. In this case, the X may correspond to a predefined value such as 50, 70, or 90, by which the present invention may be non-limited. In addition, it may be able to define a plurality of specific thresholds. Each of a plurality of the specific thresholds can be associated with each of a plurality of resource occupancy rates.

If energy per unit resource detected in frequency domain exceeds a specific threshold, it is able to determine that the resource is in use. In this case, for example, the unit resource can be defined by a PRB pair, a group of PRB pair(s), and the like. If PSSCH is transmitted in a prescribed unit (e.g., 2 PRB pairs), a UE can perform measurement in the unit.

2. Channel Quality

For example, such a legacy channel quality measurement as RSRQ, SINR, and BLER can be applied to a D2D resource as well. A resource unit for measuring channel quality can be configured in a manner of being identical to the aforementioned resource unit for measuring signal strength.

3. Information on Whether or not a Resource is Actually Used

SA (scheduling assignment)/PSCCH corresponding to control information/control channel of D2D communication carries resource information that schedules a data channel (e.g., PSSCH) which is transmitted after a control channel.

According to one embodiment of the present invention, a D2D UE decodes SA transmitted in a given resource region (e.g., SA resource region) to estimate a resource use state in a PSSCH resource region. For example, if the D2D UE successfully decodes SA, since the D2D UE is able to identify information (e.g., a position and a size of a time/frequency resource) on PSSCH scheduled by the SA, although the D2D UE does not actually receive the PSSCH, the D2D UE is able to identify information on a resource used for transmitting the PSSCH.

(1) Method of estimating resource use when SA decoding fails

As mentioned in the foregoing description, a D2D UE is able to identify a resource use state of PSSCH via SA. If the D2D UE fails to decode the SA, a problem may occur in identifying information on a resource use of PSSCH associated with the SA. Hence, the present invention proposes a method of estimating a resource use of PSSCH associated with SA when decoding on the SA fails.

(i) For example, if SA decoding fails, a measurement performing UE determines that there is no interference due to the decoding-failed SA and PSSCH associated with the SA and considers that an SA resource and a PSSCH resource associated with the SA are not currently used. For example, when a UE 1 performs measurement, if the UE 1 is unable to properly receive a signal transmitted by a UE 2 because the UE 2 is located at a distance or the signal transmitted by the UE 2 is weak, it may assume that an impact of interference between the UE 1 and the UE 2 does not exist or is negligible. In particular, if the UE 1 is unable to properly decode a signal of the UE 2, the UE 1 may consider it as there is no resource use of the UE 2.

(ii) It may use a different resource use estimation scheme according to a cause of an SA decoding failure. For example, if RSRP of decoding-failed SA (or an RS for decoding SA) is less than a threshold, a UE may assume that the SA and PSSCH associated with the SA are not influenced by interference. On the contrary, although RSRP greater than a threshold is measured, if SA decoding fails due to a different cause (e.g., interference, etc.), a UE may be able to determine that a corresponding resource region is currently used. For example, the UE may assume that interference occurs due to transmission of a different signal rather than transmission of SA and decoding on the SA has failed due to the transmission of the different signal.

(iii) If single SA is able to schedule a resource (e.g., 2 PRB pairs, 10 PRB pairs) of a prescribed size only, a UE can estimate a resource use by detecting energy in an SA resource region (e.g., SA resource pool) and using RSRP and/or RSRQ. For example, if a UE detects energy, RSRP, and/or RSRQ equal to or greater than a threshold in an SA resource region, the UE can determine that a resource (e.g., 2, 10 PRB pairs) of a determined size is used by PSSCH irrespective of whether SA decoding fails or succeeds.

(2) Information on whether or not a resource is actually used can be represented by a resource usage rate. For example, the resource usage rate can be defined as equation 19 in the following, by which the present invention may be non-limited. According to a different example, the resource usage rate can be derived from the aforementioned signal strength and/or the channel quality measurement.

Resource usage rate=(amount of resources estimated as being currently used)/(total amount of resources)  [Equation 19]

In equation 19, a denominator of the resource usage rate is defined by the total amount of resources. However, the denominator of the resource usage rate can also be defined by an amount of resources capable of being actually measured by a UE among the total amount of the resources. For example, an amount of the remaining resources from which a resource used by a measurement performing UE to perform transmission is eliminated can be used as the denominator of the resource usage rate.

(3) Meanwhile, the resource usage rate can be defined as follows. In the following, the entire resources becoming a comparison target of the resource usage rate may correspond to actual resources or the entire resources capable of being measured by a UE.

(i) As mentioned in the foregoing description, a UE can calculate a resource usage rate of a data region associated with SA by performing decoding according to an SA resource. For example, a ratio of data resources identified by SA decoding to the entire resources can be defined as the resource usage rate.

(ii) Or, the resource usage rate can be defined using information on whether or not decoding on SA succeeds (or fails) only. For example, the number of SA (e.g., SA BLER) on which decoding is successfully performed compared to the number of entire SA unit resources can be defined as a resource usage rate. The entire SA unit resources may correspond to all unit resources included in a corresponding SA resource, the total number of SA unit resources capable of being measured by a UE, or the total number of SA unit resources at which energy equal to or greater than a certain amount is detected, by which the present invention may be non-limited. In this case, the SA unit resources capable of being measured by the UE may correspond to resources from which a resource incapable of being measured by the UE due to the transmission of SA is eliminated.

(iii) The resource usage rate can be defined based on energy detection or a measurement result of an RS (e.g., RSRP, etc.). For example, when a unit resource is defined in specific resources (e.g., SA resource pool, data resource pool), a resource usage rate can be defined by a ratio of 'the number of unit resources determined as being currently used based on energy detection' to 'the total number of unit resources included in the specific resources'. A reference (e.g., threshold) for determining whether or not a unit resource is currently used can be defined in advance or can be signaled by a network.

A size and/or a threshold of a unit resource can be independently defined according to a channel corresponding to a measurement target or a resource pool. For example, a unit resource can be defined by 4 PRB pairs in a data resource pool. A UE can perform energy detection in a unit of 4 PRB pairs in a given data resource pool. The UE can determine the number of unit resources (e.g., 4 PRB pairs) at which a measurement result equal to or greater than a threshold (e.g., X) is measured as the number of resources in use. On the contrary, a unit resource can be defined by 2 PRB pairs in an SA resource pool. And, a threshold (e.g., Y) used in the SA resource pool can be independently configured irrespective of the threshold used in the data resource pool. In particular, a unit resource/threshold for performing measurement can be independently or differently configured in the SA resource pool and the data resource pool.

Measurement Request & Reporting

A D2D signal can be transmitted on various physical channels. In this case, a plurality of resource pools can be configured according to each of the physical channels. If measurement and reporting are performed on all existing physical channels and/or the resource pools, it may have a merit that efficiency of resource use is enhanced. However, it may have a demerit in that measurement/reporting overhead of a UE is considerably increased. Hence, the present invention proposes a method of performing restricted measurement rather than a method of performing measurement on all physical channels/resource pools.

1. Restricted Measurement

In order to set a limit on a measurement region, methods described in the following can be independently used or can be used in a manner of being combined.

(1) A network or a device performing scheduling of D2D communication can inform a nearby D2D capable UE of a resource on which the aforementioned measurement scheme is to be performed. Or, a resource on which measurement is to be performed can be defined in advance. Or, a part of resources on which measurement is to be performed can be defined in advance and another part of the resources can be signaled by a network.

(i) A network can indicate a UE to measure a link(s) used for D2D. In this case, the link may correspond to a different resource (e.g., PC 5 link, Uu link) distinguished from each other according to a usage or a different resource (e.g., Pcell, Scell) allocated to a different carrier. And, each of a PC 5 link and a Uu link may correspond to a different subframe set of the same carrier.

(ii) The network may indicate the UE to perform measurement according to a D2D physical channel. For example, the network may indicate the UE to measure such a D2D channel as PSSS/SSSS, PSBCH, PSDCH, PSCCH, PSSCH, and the like. Or, the network can indicate the UE to measure a plurality of D2D channels. This scheme can be used for efficiently allocating a resource according to a D2D channel.

If the scheme of performing measurement according to a physical channel is applied to the aforementioned link measurement scheme, a network can indicate a UE to transmit a specific channel only on an additional link. For example, when measurement is performed according to a channel, if a usage rate of PSSCH only is excessively high (e.g., D2D communication uses a great amount of PSSCH resources), a network receives a report on a measurement result (e.g., the usage rate of the PSSCH) and may be then able to allocate an additional link for the PSSCH only or an additional resource. This can be comprehended as physical channel-specific link switching.

(iii) A network can indicate a UE to measure a specific resource pool(s) of a specific physical channel(s). For example, it may indicate or define a resource pool (e.g., SA resource pool, data resource pool) defined for D2D to be measured. In this case, the measurement can be performed on all indicated resources or can be performed according to a resource pool.

(iv) A resource usable for performing measurement can be restricted in time domain. For example, a UE may perform measurement in a sensing window defined in time or perform measurement in a time region resource indicated by a network. The sensing window may correspond to a section in which measurement is performed to make a UE know a D2D resource status near the UE or select a resource for performing a D2D operation. The sensing window can be defined in advance. Or, a UE may perform measurement in a section indicated by nearby UEs (when nearby UEs informs the UE of information on D2D signal transmission) to select a resource in which a D2D operation is to be performed by the UE.

(v) In order to perform the abovementioned measurement methods, it may define a unit resource. In this case, the unit resource may have a different size according to a D2D channel. For example, a unit resource of SA (i.e., PSCCH) is defined by 2 PRB pairs and a unit resource of data (i.e., PSSCH) can be defined by 6 PRB pairs. When a UE performs measurement on a D2D channel, PSCCH is measured in a unit of 2 PRB pairs and PSSCH can be measured in a unit of 6 PRB pairs. A unit resource can also be used for transmitting a D2D signal and a channel can be transmitted and received via a single unit resource or a plurality of unit resources.

(2) A D2D UE can perform measurement according to a predefined rule. For example, it may be able to define a UE to perform measurement on a resource pool for a specific physical channel of a link configured to be used for D2D. For example, referring to FIG. 12, a UE belonging to network coverage can perform measurement (e.g., measure a resource usage rate of PSSCH via SA decoding) on a resource in which PC5-based V2V is performed only and report a measurement result to a network. As a different example, it may be able to define a UE supporting UL carrier aggregation to perform measurement on a resource belonging to a Pcell or a D2D resource in the Pcell only. In particular, when a measurement region is defined in advance, if a UE is configured to additionally perform a measurement on a different resource region (e.g., via higher layer signaling), the UE can perform a measurement/reporting on the different resource region.

2. Request and Reporting (1) When a measurement is requested and reported, the measurement can be performed by a periodic reporting (e.g., a measurement result is reported with a prescribed period), an aperiodic reporting (e.g., a measurement result is reported when a network or a device performing D2D resource scheduling requests the measurement result), or an event-triggered reporting (e.g., a measurement result is reported in a specific situation (when a usage rate of a D2D resource is equal to or greater than 70%)). For example, a network can signal a periodic/aperiodic measurement report request or an event-triggered based measurement reporting condition to each D2D UE via DCI or higher layer signaling.

A D2D UE may piggyback a measurement result on a UL data (e.g., PUSCH) or report the measurement result via a control channel (e.g., PUCCH). Or, a UE may report a measurement result using such a higher layer message as MAC or RRC.

For example, an event-triggered based measurement reporting condition can include a case that a resource usage rate equal to or greater than a prescribed level is maintained for more than prescribed time in a current resource region. A measurement result can be reported via a physical layer (e.g., PUCCH/PUSCH) when measurement information is promptly requested.

A network may ask a UE to report a measurement result to the network to check whether or not a specific time/frequency resource or a resource region is currently used. For example, an eNB can indicate a time/frequency resource or a resource region to be measured to a UE via physical layer signaling or higher layer signaling.

A UE can report a measurement report to an eNB via higher layer signaling such as MAC, RRC or the like when measurement information of a relatively long period is required. For example, when an eNB asks a UE to report a measurement result to the eNB to periodically or aperiodically identify a status of a specific resource pool, the UE can report the measurement result to the eNB via higher layer signaling such as MAC or RRC.

(2) It may report a measurement result using an actual measurement value or a representative value of which the actual measurement value is quantized. In order to reduce overhead of measurement reporting, if a resource usage rate is equal to or greater than a prescribed level, the resource usage rate can be reported in a form of a warning message.

(3) A measurement result reported by a UE can be determined by network signaling or can be defined in advance. For example, an item of a measurement result or a type of the measurement result to be reported can be configured via network signaling or can be defined in advance. For example, it may consider an average measurement value for a specific resource unit (e.g., the whole of a data channel, a specific resource pool, and the like), a measurement value corresponding to the top or lower M % among measurement values, the aforementioned resource usage rate, and the like as an item of a measurement result to be reported by a UE.

(4) In order to prevent a frequent change of a system parameter (e.g., a size of a resource pool, the number of resource pools, etc.), it may use hysteresis in determining whether to perform reporting. A threshold for reporting that a resource usage rate is high can be configured in a manner of being different from a threshold for reporting that a resource usage rate is low. For example, if a resource usage rate is equal to or greater than 80%, a UE can report that the resource usage rate is high. If the resource usage rate is equal to or less than 40%, the UE can report that the resource usage rate is low.

In particular, if a threshold is configured based on hysteresis, it may be able to more stably manage resources compared to a case of determining whether to use a resource based on a single threshold. In the aspect of an individual UE, the hysteresis-based threshold configuration can be used as a reference for selecting a resource to be used.

In case of using a single threshold, a problem may occur. The problem is explained in more detail. For clarity, assume that a resource usage rate corresponds to 50% as a single threshold. If a resource usage rate measured by a UE becomes 51%, since it is determined as the resource usage rate is high, a network configures an additional resource and changes a system parameter to offload UE data from a corresponding resource. However, the measured resource usage rate may become 49%. In this case, since it is determined as the resource usage rate is low, the network collects the additionally configured resource and changes the system parameter to offload the UE data again. In particular, if an operation is performed based on a single threshold, it may have a problem in that the system parameter is too frequently changed.

The problem above can be solved by using a plurality of the thresholds. For example, assume that two thresholds including a resource usage rate of 80% and a resource usage rate of 40% are used, respectively. If the resource usage rate exceeds 80%, a UE reports that the resource usage rate is high to a network and the network allocates an additional resource to the UE. If the resource usage rate is not going down to a resource usage rate equal to or less than 40% after the additional resource is allocated, since the UE does not report that the resource usage rate is low, it may be able to solve a problem of repeating additional resource configuration and resource collection.

(5) Additional information included in measurement report (i) When a UE performs measurement, if the UE performs D2D transmission as well, the UE may have a region in which measurement is not available due to a half-duplex problem. In particular, it may fail to simultaneously perform transmission and reception in the same time-frequency resource due to a half-duplex constraint. Since the measurement monitors a resource and detects a signal from the monitored resource, the measurement can be regarded as a procedure of receiving a signal. In this case, the half-duplex constraint means that a UE is unable to transmit and receive a signal at the same time on a specific band. For example, a UE (e.g., a half-duplex based UE) can perform either transmission or reception in the same time-frequency resource. However, the UE is unable to perform the transmission and the reception at the same time. For example, when a UE1 transmits a first signal, if a UE2 transmits a second signal via the same resource, the UE2 is unable to receive/measure the first signal of the UE1.

According to one embodiment of the present invention, when a UE reports a measurement result to a network, the UE can report a region on which measurement is performed and/or a region on which the measurement is not performed (e.g., a resource pool, T-RPT) to the network. The region on which the measurement is not performed may include a region in which a signal is transmitted by the UE.

(ii) A D2D resource left-over or a D2D resource shortage may occur depending on wireless communication environment (e.g., a region). A D2D resource is additionally allocated to a region lack of D2D resources and a D2D resource is reduced in other region to additionally allocate a cellular resource. Hence, when a UE reports a measurement result, the UE may report location information of the UE (e.g., GPS-based location information) together with the measurement result.

In this case, the location information can be replaced with RSRP for a cell signal capable of being measured by the UE. For example, RSRP for a serving cell signal and/or RSRP for a neighboring cell can be used as the location information. If a UE reports RSRP of a serving cell and RSRP of a neighboring cell, the serving cell estimates a location of the UE based on the RSRP and may be then able to adjust a D2D resource of a corresponding region (i.e., the estimated location).

Resource Re-Allocation

When UEs perform measurement, if it is determined that a specific link is used more than a prescribed level, a network can control a link selection/usage rate of each UE. For example, if there is no separate indication from the network, a UE can be configured to use a PC5 link only to perform D2D communication.

If a usage rate reported by a UE belonging to a cell is equal to or greater than a prescribed level, a network indicates UEs to configure a selection ratio of a Uu link and a selection ratio of a PC5 link by 40% and 60%, respectively, and select/use a link. In the aspect of an individual UE, such a ratio as 40%:60% signaled from the network can be comprehended as a link selection probability. In particular, it may be able to comprehend as a probability for a UE to select/use a Uu link for D2D communication corresponds to 40% and a probability for the UE to select/use a PC5 link for D2D communication corresponds to 60%. In particular, a UE can select a link and/or a resource to be used for performing D2D communication based on a probability function.

If a network or a device performing D2D resource scheduling receives a measurement report from a UE, the network or the device may newly allocate a D2D resource, allocate a D2D resource in addition to a legacy D2D resource, or reduce a legacy D2D resource.

In D2D communication, for example, in vehicle-related D2D communication, a resource usage rate may considerably change in every moment. Hence, it is preferable to adjust a usage rate of a newly allocated resource and a usage rate of a previously allocated resource by introducing a probability of resource reallocation and/or a link selection probability.

For example, a default link can be set or signaled to a UE in advance to perform D2D communication. If a usage rate of the default link exceeds X %, a network can signal the UE to use an additional link. In this case, a selection probability of the additional link and a selection probability of the default link can be defined in advance or can be signaled by the network.

The default link and the additional link may correspond to a PC5 link and a Uu link, respectively, by which the present invention may be non-limited. For example, in FIG. 12, although it is assumed that the PC5 link is configured as the default link, the Uu link can also be configured as the default link. This can be defined in advance or can be configured via signaling. In FIG. 12, if a usage rate of the PC5 link measured by a UE (e.g., VUE1) exceeds 80%, a network configures a probability of selecting the Uu link by 80% and a probability of selecting th PC5 link by 20% for V2I communication in a cell. The network can signal the UE to select a V2I resource based on the probabilities. If the usage rate of the PC5 link is reduced to a usage rate equal to or less than a specific threshold (e.g., 50%), the network may prohibit the UE from using the Uu link or lower the probability of selecting the Uu link. The network can perform the configuration of the link selection probability and the signaling procedure during a prescribed period or according to the occurrence of a specific event (e.g., if a usage rate of a specific link exceeds 80%).

The method above can be applied to V2V (e.g., a VUE2 in FIG. 12) as well. For example, a PC5 link can be configured as a default link for V2V/V2I. A selection probability of the PC5 link and a selectin probability of the Uu link can be signaled via network signaling. A network changes a link selection probability based on a resource usage rate reported by a UE and can inform the UE of the changed link selection probability.

Meanwhile, similar to the abovementioned example, a default link between UEs used in D2D can be restricted to a Pcell (or Scell) resource. When the Pcell (or Scell) resource is measured, if a usage rate of the Pcell (or Scell) resource is high, it may be able to configure the Pcell (or Scell) resource to be used.

Co-Operation for Resource Selection

In D2D or V2V, if a network is unable to schedule a resource region (e.g., resource pool), a UE performs the aforementioned measurement in a given resource and can perform D2D communication using a measurement result. For example, if a UE is unable to report a measurement result to a network or is located at environment incapable of receiving a configuration of a resource region from the network, the UE can (re)select a resource region and/or a link using a measurement result.

Meanwhile, a measurement is performed by a transmission UE (or reception UE) and the transmission UE can select a transmission resource from a resource region. As a different method, when a D2D connection is established through interaction (e.g., signal exchange) between UEs, each of the UEs can exchange a measurement result each other in the procedure of establishing the D2D connection. Subsequently, a UE can determine a resource for a D2D pair consisting of the UE and the partner UE based on the exchanged measurement result.

BLER Reporting

As a further different method of determining whether or not a resource is used, when a UE receives a D2D message, the UE can report reception performance of the UE using a periodic scheme, an aperiodic scheme, or an event-triggered scheme. For example, the UE can report a BLER (block error rate) for a D2D message received by the UE to a network. The network receives BLER reports from a plurality of UEs and can identify an overall D2D resource use state based on the BLER reports. Having identified the D2D resource use state, the network can perform the aforementioned additional link allocation and the resource collection.

In addition, the UE can report information on a resource in which the D2D message is received to the network. By doing so, the network is able to determine a currently used resource. The information on the resource can include at least one of a PRB pair(s), a resource pool, T-RPT, a resource position in frequency domain, and an amount of resources, by which the present invention may be non-limited.

Figure 13:
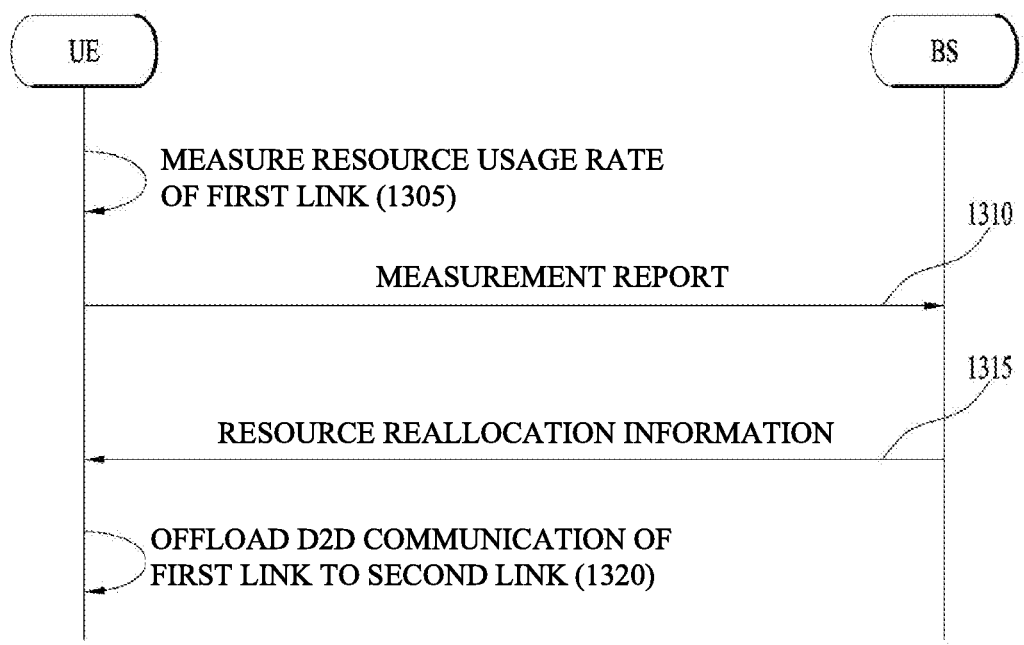
FIG. 13 illustrates a measurement reporting method according to one embodiment of the present invention.

FIG. 13 illustrates a measurement and reporting method according to one embodiment of the present invention. Explanation on contents overlapped with the aforementioned description is omitted.

Referring to FIG. 13, a UE measures a resource usage rate of a first link currently used to perform D2D communication [S1305]. The first link may correspond to a PC5 link.

The resource usage rate can be measured using at least one of RSSI (received signal strength indicator), RSRP (reference signal received power), and SA (scheduling assignment) scheduling D2D data which are detected from the first link. The UE estimates an amount of resources allocated for D2D data through the SA and can measure the resource usage rate by dividing the amount of resources allocated for D2D data by the total amount of D2D resources. If decoding of the SA fails and RSRP of the SA is less than a threshold, the UE can measure the resource usage rate under the assumption that there is no resource allocated for the SA and the D2D data. The total amount of D2D resources may correspond to the remaining resources except a resource in which transmission is performed by the UE among a D2D data resource region.

The UE can transmit a measurement report to a base station [S1310]. For example, if a measured resource usage rate exceeds a first threshold or is less than a second threshold, the UE can transmit a measurement report including the measured resource usage rate to the base station.

The measurement report can include a flag indicating whether a resource usage rate is high or low. If the resource usage rate exceeds the first threshold, the flag can be configured as high. If the resource usage rate is less than the second threshold, the flag can be configured as low.

The UE receives resource reallocation information from the base station [S1315]. The resource reallocation information can be used for off-loading D2D communication. The resource reallocation information is not restricted by the terminology.

The resource reallocation information can a probability value indicating a probability that the first link will be used for the D2D communication, and a probability value indicating a probability that a second link will be used for the D2D communication, the second link being configured in a resource different from a resource of the first link. The second link may correspond to a Uu link. For example, if a resource usage rate exceeds the first threshold, a probability of selecting the second link can be configured to be higher than a probability of selecting the first link. On the contrary, if the resource usage rate is less than the second threshold, a probability of selecting the second link can be configured to be lower than a probability of selecting the first link.

The UE can offload D2D communication on the first link to the second link [S1320]. For example, when the second link is selected as a result of performing a link selection based on the probability values the UE can offload D2D communication performed on the first link to the second link.

Figure 14:
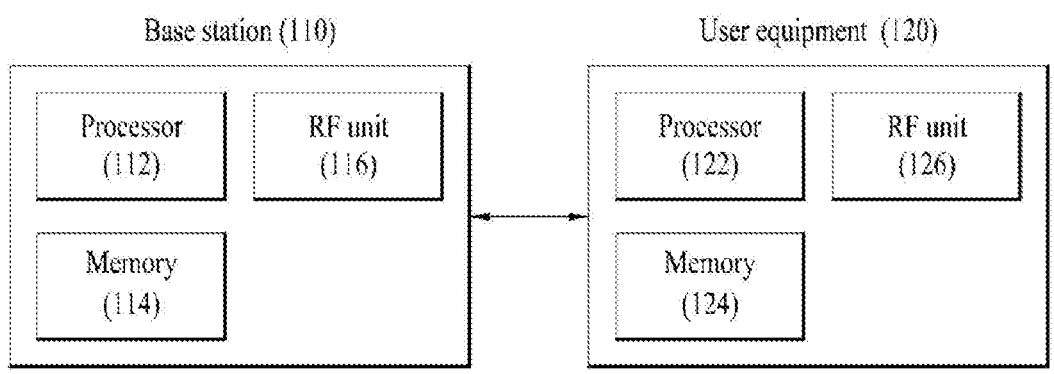
FIG. 14 is a view illustrating a user equipment (UE) and a base station (BS) according to an embodiment of the present invention.

FIG. 14 is a view illustrating a user equipment (UE) and a base station (BS) according to an embodiment of the present invention. The BS and UE illustrated in FIG. 14 may perform signal transmitting/receiving operations according to aforementioned embodiments.

Referring to FIG. 14, a wireless communication system includes a BS 110 and a UE 120. In downlink, a transmitter may be a part of the BS 110, and a receiver may be a part of the UE 120. In uplink, a transmitter may be a part of the UE 120, and a receiver may be a part of the BS 110. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores various pieces of information related to operations of the processor 122. The RF unit 126 is connected to the processor 122 and transmits and/or receives RF signals. The BS 110 and/or the UE 120 may have a single antenna or multiple antennas.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', etc.

The above-described embodiments of the present invention can be implemented by a variety of means, for example, hardware, firmware, software, or a combination thereof. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention as described above are applicable to various wireless communication systems such as the 3GPP wireless communication system.

What is claimed is:

1. A method of measuring and reporting a device-to-device (D2D) resource by a user equipment (UE) supporting D2D communication, the method comprising:
measuring a resource usage rate of a first link used by the UE for communicating with another UE;
transmitting, to a base station, a measurement report containing the measured resource usage rate, when the measured resource usage rate exceeds a first threshold or is less than a second threshold;
receiving, from the base station, resource reallocation information for off-loading the D2D communication,
performing a link selection between the first link and a second link,
wherein the second link is configured for communication between the UE and the base station and configured in a resource different from a resource of the first link based on the resource reallocation information, and
off-loading the D2D communication to the second link when the second link is selected during the link selection,
wherein the resource reallocation information contains a first probability value indicating a probability that the first link will be selected for the D2D communication, and a second probability value indicating a probability that the second link will be selected for the D2D communication, and
wherein the first probability is less than the second probability when the measured resource usage rate exceeds the first threshold, and the first probability is greater than the second probability when the measured resource usage rate is less than the second threshold.

2. The method of claim 1,
wherein the measurement report contains a flag indicating whether the resource usage rate is high or low, and
wherein when the resource usage rate exceeds the first threshold, the flag is configured as high, and when the resource usage rate is less than the second threshold, the flag is configured as low.

3. The method of claim 2, wherein the resource usage rate is measured using at least one of a received signal strength indicator (RSSI), a reference signal received power (RSRP), and a scheduling assignment (SA) scheduling D2D data which are detected from the first link.

4. The method of claim 3, wherein in measuring the resource usage rate of the first link, the UE estimates an amount of resources allocated for the D2D data through the SA and measures the resource usage rate by dividing the amount of resources allocated for the D2D data by a total amount of D2D resources.

5. The method of claim 4, wherein in measuring the resource usage rate of the first link, if decoding of the SA fails and RSRP of the SA is less than a threshold, the UE measures the resource usage rate by assuming that there is no resource allocated for the SA and the D2D data.

6. The method of claim 4, wherein the total amount of the D2D resources corresponds to remaining resources except a resource in which transmission is performed by the UE among a resource region for the D2D data.

7. A user equipment (UE) supporting device-to-device (D2D) communication comprising:
a transmitter and a receiver, and
a processor operatively coupled to the transmitter and the receiver, and configured to:
measure a resource usage rate of a first link used by the UE for communicating with another UE,
transmit, to a base station, a measurement report containing the measured resource usage rate when the measured resource usage rate exceeds a first threshold or is less than a second threshold,
receive, from the base station, resource reallocation information for off-loading the D2D communication,
perform a link selection between the first link and a second link,
wherein the second link is configured for communication between the UE and the base station and configured in a resource different from a resource of the first link based on the resource reallocation information, and
off-load the D2D communication to the second link when the second link is selected during the link selection,
wherein the resource reallocation information contains a first probability value indicating a probability that the first link will be selected for the D2D communication, and a second probability value indicating a probability that the second link will be selected for the D2D communication, and wherein the first probability is less than the second probability when the measured resource usage rate exceeds the first threshold, and the first probability is greater than the second probability when the measured resource usage rate is less than the second threshold.

8. The UE of claim 7, wherein the measurement report contains a flag indicating whether the resource usage rate is high or low, and wherein when the resource usage rate exceeds the first threshold, the flag is configured as high, and when the resource usage rate is less than the second threshold, the flag is configured as low.

9. The UE of claim 7, wherein the resource usage rate is measured using at least one of a received signal strength indicator (RSSI), a reference signal received power (RSRP), and a scheduling assignment (SA) scheduling D2D data which are detected from the first link.

10. The UE of claim 9, wherein the processor is further configured to estimate an amount of resources allocated for the D2D data through the SA and measure the resource usage rate by dividing the amount of resources allocated for the D2D data by a total amount of D2D resources.

11. The user equipment UE of claim 10, wherein the processor is further configured to measure the resource usage rate by assuming that there is no resource allocated for the SA and the D2D data if decoding of the SA fails and RSRP of the SA is less than a threshold.

12. The UE of claim 10, wherein the total amount of the D2D resources corresponds to remaining resources except a resource in which transmission is performed by the UE among a resource region for the D2D data.

* * * * *